United States Patent
Mizoguchi

(10) Patent No.: US 9,912,200 B2
(45) Date of Patent: Mar. 6, 2018

(54) PROCESSING APPARATUS

(71) Applicant: SEIKO EPSON CORPORATION, Tokyo (JP)

(72) Inventor: Masahiko Mizoguchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 249 days.

(21) Appl. No.: 15/018,183

(22) Filed: Feb. 8, 2016

(65) Prior Publication Data

US 2016/0261150 A1    Sep. 8, 2016

(30) Foreign Application Priority Data

Mar. 6, 2015   (JP) ................. 2015-044375

(51) Int. Cl.
| | |
|---|---|
| *H01F 38/00* | (2006.01) |
| *H02J 50/80* | (2016.01) |
| *H02J 50/10* | (2016.01) |
| *H02J 50/40* | (2016.01) |
| *H02J 50/90* | (2016.01) |

(52) U.S. Cl.
CPC .............. *H02J 50/80* (2016.02); *H02J 50/10* (2016.02); *H02J 50/40* (2016.02); *H02J 50/90* (2016.02)

(58) Field of Classification Search
None
See application file for complete search history.

(56) References Cited

U.S. PATENT DOCUMENTS

| | | | |
|---|---|---|---|
| 2012/0025760 A1 | 2/2012 | Uramoto et al. | |
| 2012/0162127 A1* | 6/2012 | Onoda | G06F 3/0416 345/174 |
| 2013/0154554 A1* | 6/2013 | Sakai | H02J 7/025 320/108 |

FOREIGN PATENT DOCUMENTS

| | | |
|---|---|---|
| JP | 2010-022105 A | 1/2010 |
| JP | 2010-268610 A | 11/2010 |
| JP | 2012-034454 A | 2/2012 |
| JP | 2014-003790 A | 1/2014 |
| JP | 2014-023253 A | 2/2014 |

* cited by examiner

*Primary Examiner* — Cassandra Cox
(74) *Attorney, Agent, or Firm* — Global IP Counselors, LLP

(57) ABSTRACT

A processing apparatus includes a detector, a control section, and the processing section. The detector is configured to detect a position of a device which is a target of a process. The control section is configured to determine a priority of the device based on determining, using the position of the device, whether or not the device is moved according to a predetermined movement pattern. The processing section is configured to perform the process on the device based on the priority of the device.

11 Claims, 10 Drawing Sheets

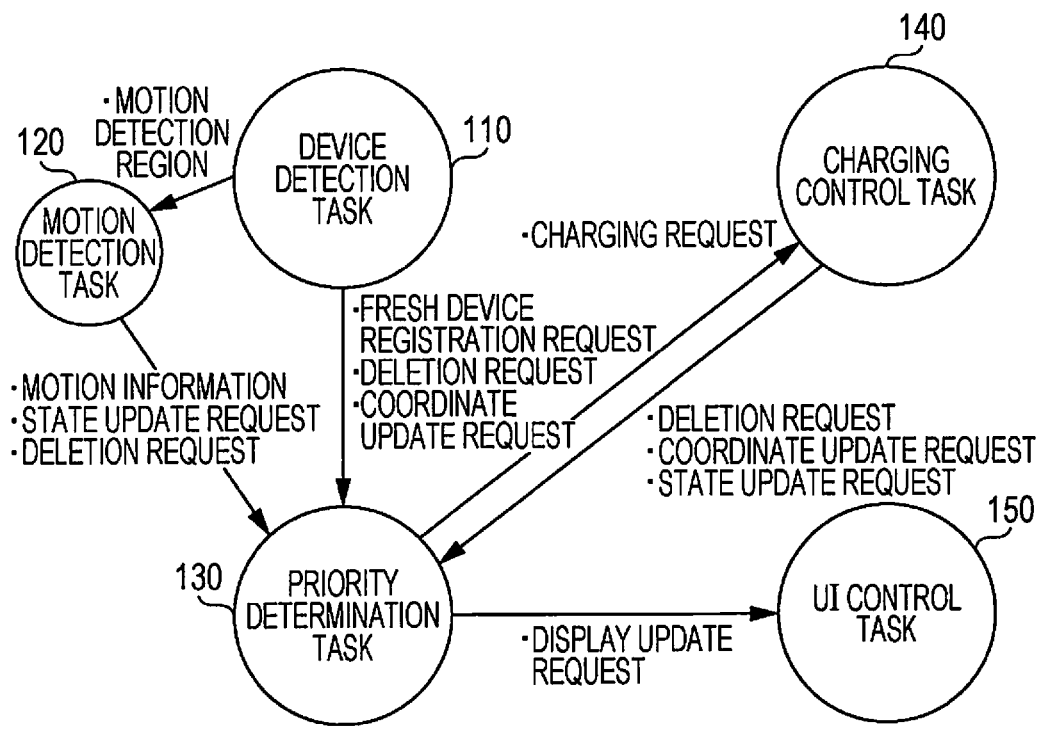

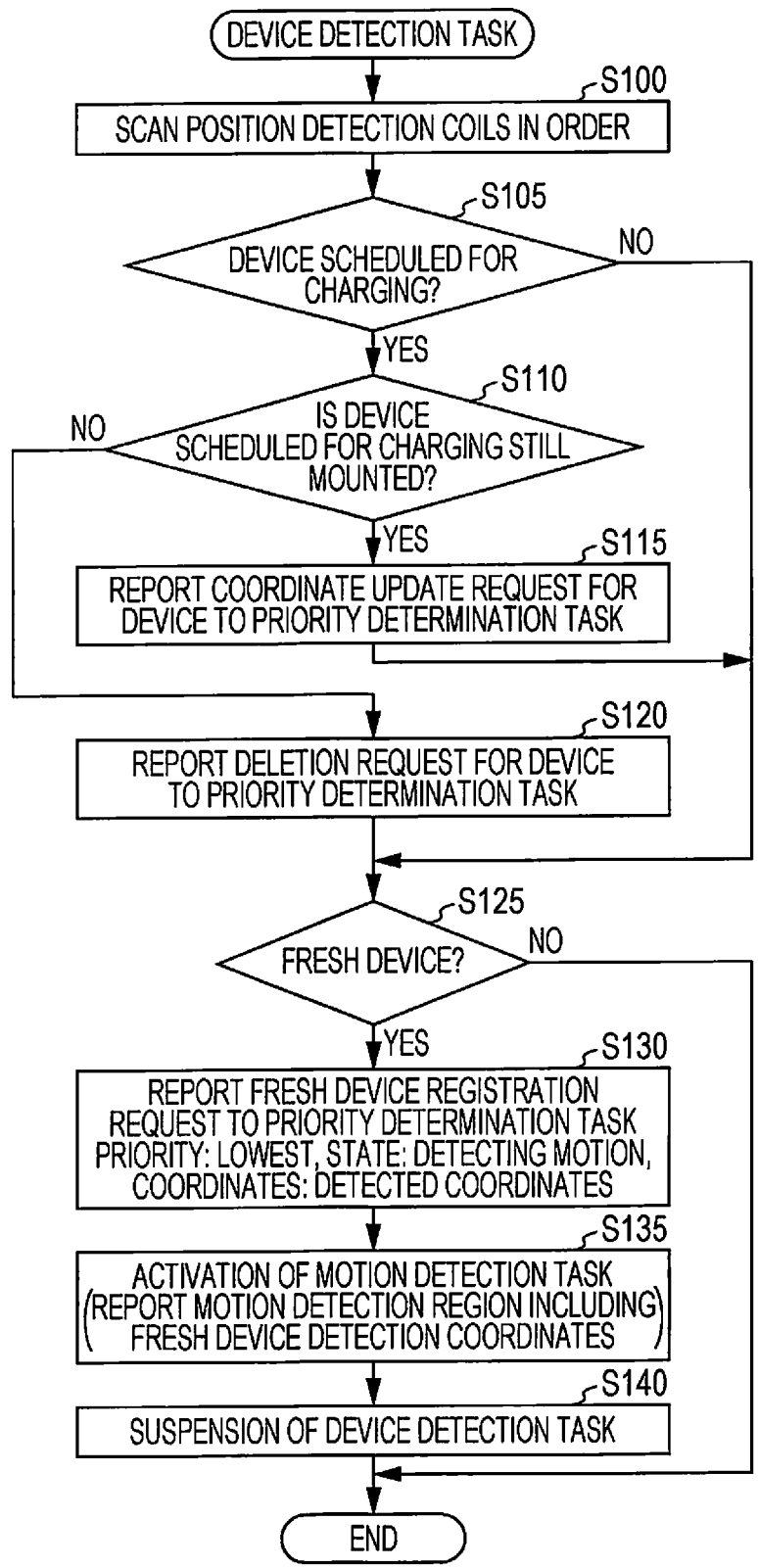

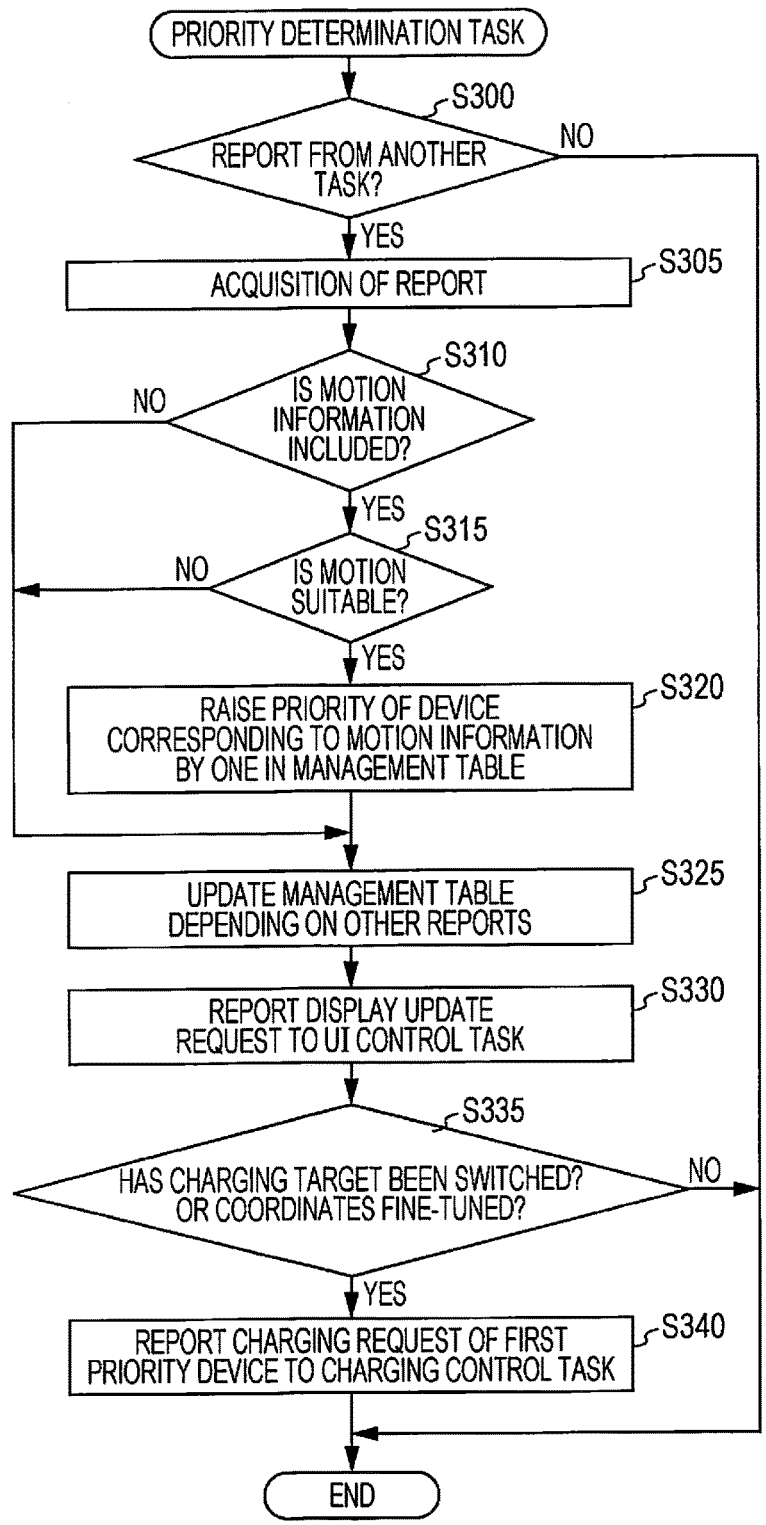

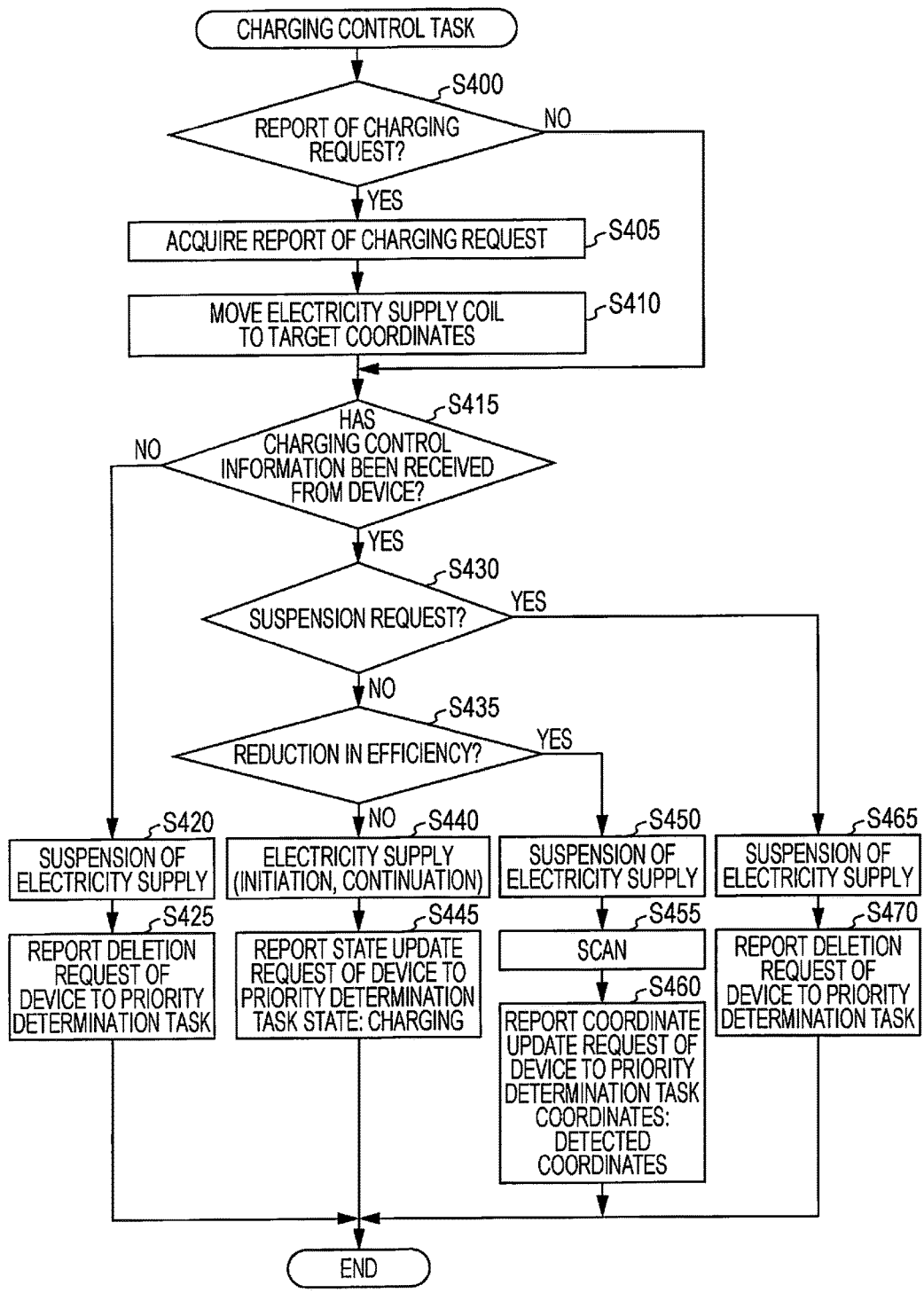

PROCESSING APPARATUS

CROSS-REFERENCE TO RELATED APPLICATIONS

This application claims priority to Japanese Patent Application No. 2015-044375 filed on Mar. 6, 2015. The entire disclosure of Japanese Patent Application No. 2015-044375 is hereby incorporated herein by reference.

BACKGROUND

Technical Field

The present invention relates to a processing apparatus that performs a process with a plurality of devices as the targets thereof.

Related Art

In the related art, contactless charging electronic apparatuses that can charge a device such as a digital camera or a smartphone without having a metal contact with the corresponding device, has been known (for example, in JP-A-2010-22105).

However, in contactless charging electronic apparatuses of the related art, there is a problem in that it is difficult to designate a charging priority of a plurality of devices according to the intentions of a user. For example, JP-A-2010-22105 discloses the acquisition of information, which acts as a determination material for determining a charging priority, from a device, but a priority based on the information acquired from a device does not necessarily always match the intentions of a user. In addition, the same also applies to cases of performing processes other than charging on a plurality of devices.

SUMMARY

An advantage of some aspects of the invention is to provide a processing apparatus that easily designates a priority of each device.

According to an aspect of the invention, a processing apparatus includes a detector, a control section, and a processing section. The detector is configured to detect a position of a device which is a target of a process. The control section is configured to determine a priority of the device based on determining, using the position of the device, whether or not the device is moved according to a predetermined movement pattern. The processing section is configured to perform the process on the device based on the priority of the device.

According to the aspect of the invention, the process is wireless power transfer.

According to the aspect of the invention, the process is wireless data communication with the device.

According to the aspect of the invention, the processing apparatus further includes a housing on which the device is configured to be mounted and that is configured to function as a display. The detector is configured to detect the position of the device on the housing, and the processing section is configured to perform the process on the device on the housing. The control section is configured to cause the display to display information on the priority of the device in a vicinity of the device.

According to the aspect of the invention, the control section is configured to raise or lower the priority of the device determining whether or not the device is moved according to the predetermined movement pattern.

According to the aspect of the invention, the control section is configured to determine the priority of the device to perform wireless power transfer relative to the device, depending on determining whether or not the device is moved according to a first predetermined movement pattern, and further initiate wireless data communication with the device depending on whether or not the device is moved according to a second movement pattern that is different from the first predetermined movement pattern.

According to the aspect of the invention, in response to detecting a new device, the detector is configured to set a detection frequency of a position of the new device to be higher than when the new device is not detected, and set a range of position detection of the new device to be detected at the detection frequency to be smaller than when the new device is not detected, during a predetermined period that follows the detecting of the new device and is established in advance.

BRIEF DESCRIPTION OF THE DRAWINGS

Referring now to the attached drawings which form a part of this original disclosure:

FIG. 2A is a task configuration diagram;

FIG. 2B is a data structural drawing of a management table;

FIG. 3A is a flowchart of a device detection task;

FIG. 4 is a flowchart of a priority determination task;

FIG. 5 is a flowchart of a charging control task;

DETAILED DESCRIPTION OF EXEMPLARY EMBODIMENTS

Figure 1A:
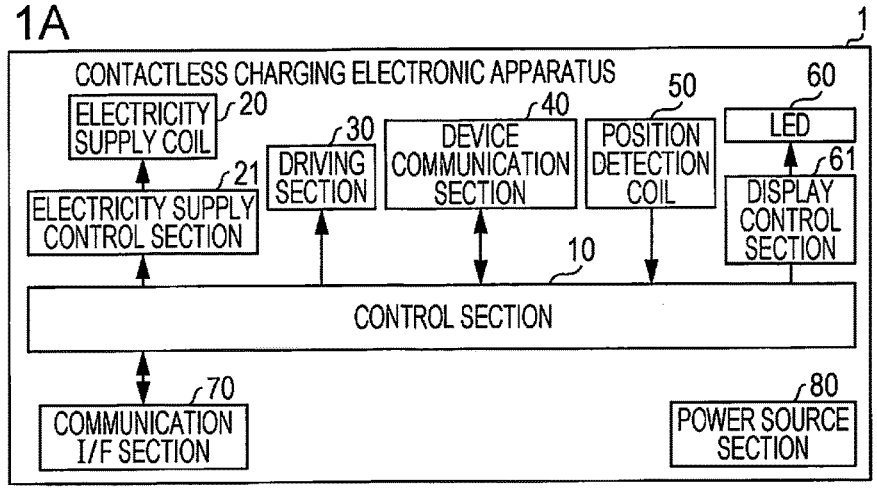
FIG. 1A is a block diagram that shows a configuration of a contactless charging electronic apparatus.

Hereinafter, embodiments of the invention will be described in the following order while referring to the appended drawings. Additionally, in each drawing, the same reference numerals are applied to corresponding constituent elements, and overlapping descriptions thereof will be omitted.

1. First Embodiment 1-1. Configuration

Figure 1B:
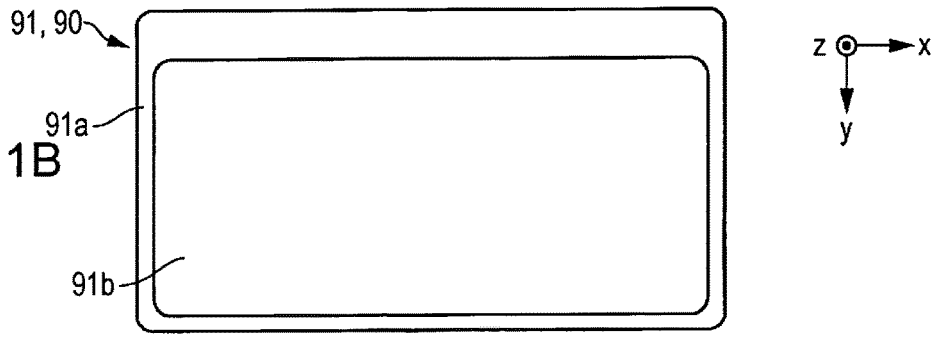
FIG. 1B is a top view.
Figure 1C:
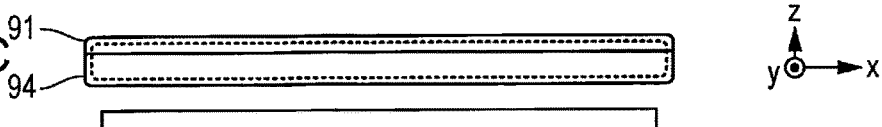
FIG. 1C is a lateral view.
Figure 1D:
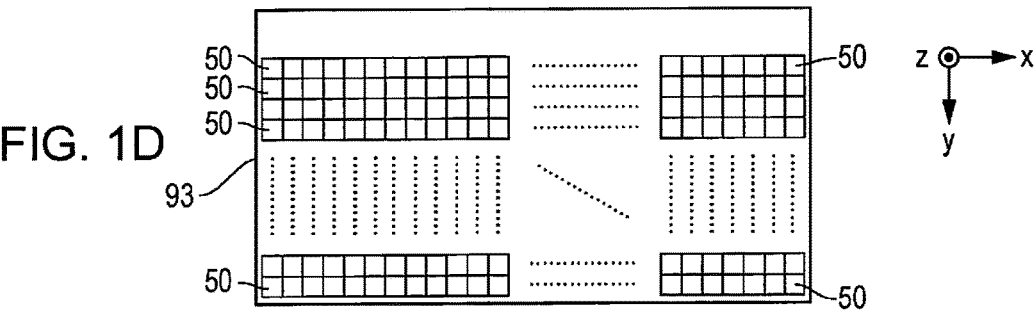
FIG. 1D is an explanatory diagram of position detection coils.
Figure 1E:
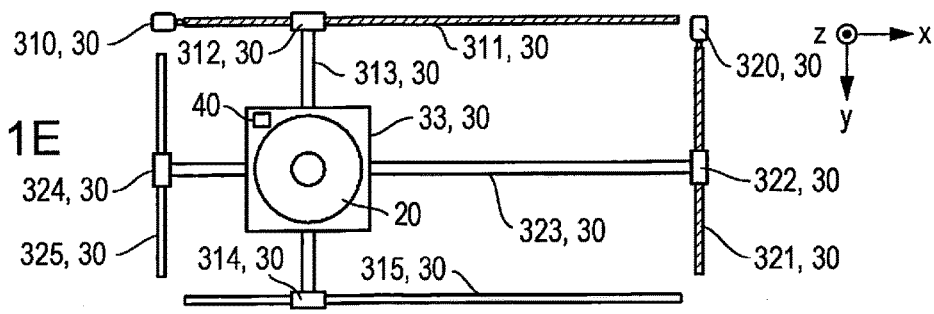
FIG. 1E is an explanatory diagram of a driving section.

FIG. 1A is a block diagram that shows a configuration of a contactless charging electronic apparatus (hereinafter, simply referred to as a charging apparatus) 1 as a processing apparatus according to the first embodiment. FIG. 1B is a top view of the charging apparatus 1, FIG. 1C is a lateral view of the charging apparatus 1, FIG. 1D is a schematic diagram for describing position detection coils of the charging apparatus 1, and FIG. 1E is a schematic diagram for describing driving of an electricity supply coil. The charging apparatus 1 is provided with a control section 10, an electricity supply coil 20, an electricity supply control section 21, a driving section 30, a device communication section 40, position detection coils 50, an LED 60, a display control section 61, a communication I/F section 70, a power source section 80, and a housing 90.

The housing 90 includes a cover section 91 and a box section 94, and accommodates each section that is shown in FIGS. 1A to 1E. The housing 90 functions as a platform on which a target charging device (hereinafter, simply referred to as a device) is disposed or mounted. The cover section 91 includes a mounting section 91b, which has a flat surface (a mounting surface) on which a device is mounted, and a frame section 91a, which supports the periphery of the mounting section 91b. In the present embodiment, a width direction of the charging apparatus 1, which is a direction that is parallel to the mounting surface of the mounting section 91b, is defined as an x axis, a direction of the charging apparatus 1, which is a direction that is orthogonal to the width direction and parallel to the mounting surface, is defined as a y axis, and a direction that is orthogonal to the mounting surface is defined as a z axis.

A substrate 93, which is shown in FIG. 1D, and the driving section 30, which is shown in FIG. 1E, are laminated and accommodated inside the housing 90 in order of proximity to the cover section 91. The substrate 93 is fixed to the box section 94 with a posture that is parallel to an xy plane. A plurality of position detection coils 50 are disposed on the substrate 93 in matrix form in a region that overlaps with the mounting section 91b. The charging apparatus 1 performs electricity supply (power supply) by detecting the position of a coil on a side of a device that is mounted on the mounting surface with the position detection coils 50 using electromagnetic induction, and moving the electricity supply coil 20 to the corresponding position. In particular, the charging apparatus 1 performs wireless power transfer that does not require direct metal contact with the device mounted on the mounting surface. Therefore, the driving section 30 is provided with a motor and a movement mechanism for moving the electricity supply coil 20 in a direction that is parallel to the x axis and a direction that is parallel to the y axis.

More specifically, the driving section 30 includes a first ball screw 311, which extends in a direction that is parallel to the x axis, a first support rail 315, a first motor 310 (configured as a stepping motor, for example), which rotates the first ball screw 311, a first support pole 313, which extends across to a first support rail 315 from the first ball screw 311, and connection sections 312 and 314. The first support pole 313 is connected to the first ball screw 311 via the connection section 312. A hole that penetrates through in a direction that is parallel to the x axis is formed in the connection section 312. An uneven portion is formed on an inner wall surface of the hole, and the uneven portion meshes together with an uneven portion that is formed on the first ball screw 311. In addition, the first support pole 313 is connected to the first support rail 315 via the connection section 314. A hole that penetrates through in a direction that is parallel to the x axis is formed in the connection section 314, and the first support rail 315 is passed through the corresponding hole. The connection section 314 is capable of moving along the first support rail 315.

Furthermore, the driving section 30 includes a second ball screw 321, which extends in a direction that is parallel to the y axis, a second support rail 325, a second motor 320, which rotates the second ball screw 321, a second support pole 323, which extends across to a second support rail 325 from the second ball screw 321, and connection sections 322 and 324.

The second support pole 323 is connected to the second ball screw 321 via the connection section 322. A hole that penetrates through in a direction that is parallel to the y axis is formed in the connection section 322. An uneven portion is formed on an inner wall surface of the hole, and the uneven portion meshes together with an uneven portion that is formed on the second ball screw 321. In addition, the second support pole 323 is connected to the second support rail 325 via the connection section 324. A hole that penetrates through in a direction that is parallel to the y axis is formed in the connection section 324, and the second support rail 325 is passed through the corresponding hole. The connection section 324 is capable of moving along the second support rail 325.

The electricity supply coil 20 is fixed to a support platform 33. A first hole that penetrates through in a direction that is parallel to the y axis is formed in the support platform 33. In addition, a second hole that penetrates through in a direction that is parallel to the x axis is formed in a position of the support platform 33 that differs from that of the first hole in a direction that is parallel to the z axis. The first support pole 313 is passed through the first hole in a slidable manner, and the second support pole 323 is passed through the second hole in a slidable manner. As a result of the first motor 310 rotating the first ball screw 311 around an axis that is parallel to the x axis, the connection section 312, the first support pole 313, the support platform 33, and the connection section 314 move integrally in a direction that is parallel to the x axis. In addition, as a result of the second motor 320 rotating the second ball screw 321 around an axis that is parallel to the y axis, the connection section 322, the second support pole 323, the support platform 33, and the connection section 324 move integrally in a direction that is parallel to the y axis. Additionally, a movement direction depends on the orientation of rotation. As a result of the abovementioned configuration, the electricity supply coil 20, which is supported on the support platform 33, can move in a plane that is parallel to the xy plane. Additionally, both end sections of the first ball screw 311 and both end sections of the second ball screw 321 are supported by the box section 94 in a rotatable manner. Additionally, both end sections of the first support rail 315 and both end sections of the second support rail 325 are supported by the box section 94.

A plurality of LEDs 60 (not illustrated in FIG. 1D) are disposed on the substrate 93 in matrix form in a region that overlaps with the mounting surface as viewed in the direction parallel to the z axis. The display control section 61 controls the turning on and off, and the brightness of each LED that is disposed in matrix form depending on a control signal from the control section 10, and can advise a user of various information using the plurality of LEDs 60. Additionally, the mounting section 91b is configured by a material that transmits light that is emitted by the LEDs 60, and it is possible for a user to recognize information that is displayed using the LEDs 60 via the mounting section 91b. Therefore, the housing 90 also functions as a display.

The device communication section 40 is disposed on the support platform 33, and is capable of moving integrally with the support platform 33. In the present embodiment, the device communication section 40 is provided with an IC tag control section, an IC tag reader, and an antenna (none of which are illustrated in the drawings), and performs wireless communication with a device, which is a device that is mounted on the mounting section 91b, and which receives power supply from the electricity supply coil 20. In the present embodiment, the device communication section 40 receives charging control information such as identification information of a device, a residual capacity of a secondary battery that the device is provided with, and electricity supply suspension requests from the side of the device. Additionally, a wire that connects to the electricity supply coil 20 and a wire that connects to the device communication section 40 are connected to the substrate 93 by a flexible substrate, which is not illustrated in the drawings.

The communication I/F section 70 is provided with an interface circuit for communication between external apparatuses and the control section 10 using wired or wireless communication. The power source section 80 supplies power, which is obtained from an alternating current (AC) power source via a power outlet, to each section of the charging apparatus 1 including the electricity supply coil 20. The control section 10 is provided with a Central Processing Unit (CPU), a Read-Only Memory (ROM), a Random-Access Memory (RAM), and the like, and the CPU controls each section of the charging apparatus 1 by executing control programs, which are stored in the ROM, using the RAM. A task program, which will be described later, is included in the corresponding control programs. The electricity supply control section 21 controls an electricity supply action from the electricity supply coil 20 depending on instructions of the control section 10. In the present embodiment, the position detection coil 50 is equivalent to a "detector", and the electricity supply coil 20 and the electricity supply control section 21 are equivalent to a "processing section".

1-2. Charging Priority Determination

In a case in which a plurality of devices are mounted on the mounting section 91b, in the charging apparatus 1, a priority is allocated to each device, and devices with higher priority are charged preferentially, that is, first. When charging of a given device finishes, charging of the next device in the order of priority is initiated. Let us assume that generally, devices mounted earlier have a higher charging priority in the charging apparatus 1. Accordingly, in a case in which a new device is mounted in a state in which one or more devices are already mounted, the priority of the new device is the lowest. However, in the present embodiment, when a user mounts a new device, in a case in which the corresponding device is moved with a motion (an action) of a predetermined movement pattern in a state in which the corresponding device is placed on the mounting section 91b during a predetermined period immediately after mounting (a motion detection period), it is possible to raise the priority thereof one by one from the lowest priority. A number by which the priority is raised changes depending on a length of time for which the motion of the predetermined movement pattern continues during the motion detection period. In addition, in the charging apparatus 1, a user is advised of information, which shows the priority that is allocated to each device on the mounting section 91b using lighting control of the plurality of LEDs 60.

FIG. 2A is a view that shows a configuration of tasks which the control section 10 performs in order to realize the abovementioned function. The five tasks that are shown in FIG. 2A are each repeatedly executed for a predetermined period length, which is established in advance for each task. A device detection task 110 detects the presence or absence (including a position) of a device on the mounting section 91b using the position detection coils 50, and reports fresh device registration requests, deletion requests, and coordinate update requests to a priority determination task 130 on the basis of detected information. In addition, in a case in which a device is newly mounted, the device detection task 110 reports a region for detecting motion (a motion detection region) to a motion detection task 120. The motion detection task 120 is a task that is executed in place of the device detection task 110 at a higher frequency than the device detection task 110 during the motion detection period. The motion detection task 120 detects motion in the motion detection region, and reports motion information, state update requests and deletion requests to the priority determination task 130 on the basis of detected information. In the present embodiment, if the motion detection period ends without the device detection task 110 being executed during the motion detection period, in which the motion detection task 120 is repeatedly executed, the device detection task 110 is repeatedly executed again for a predetermined period length (if the motion detection period ends, the motion detection task 120 is not executed).

The priority determination task 130 determines priority on the basis of reports from the device detection task 110, the motion detection task 120 and the charging control task 140, and reports a charging request to the charging control task 140 so that charging is performed with respect to a device with the highest priority. In addition, the priority determination task 130 reports display update requests to the UI control task 150. The charging control task 140 performs charging with respect to a device for which a charging request is reported from the priority determination task 130, and reports deletion requests, coordinate update requests and state update requests of the device on the basis of charging control information, and the like, that is acquired from the device to the priority determination task 130. The UI control task 150 performs display of information, which shows the priority, and the like, on the basis of reports of display update requests from the priority determination task 130. Next, the process contents of each task will be described while referring to flowcharts.

FIG. 3A is a flowchart that shows the process contents of the device detection task 110. The device detection task 110 is, for example, repeatedly executed for a period length of 1 second. Firstly, the control section 10 scans the position detection coils 50 in order (Step S100). More specifically, the control section 10 passes a weak detection current through each of the position detection coils 50 that are shown in FIG. 1D in order one by one, and detects the presence or absence of a change in a current value. Since the current values of the position detection coils 50, which are disposed in positions that overlap with the position of the coil of the corresponding device, change in a case in which a device is mounted, it is possible to detect a position of the device on the basis of corresponding changes in current values. In addition, the control section 10 can detect that a device has been removed from the fact that there are no changes in the current values at the position in which the device was mounted during a previous scan. Additionally, in a case in which there is a device that is being charged, the scan is performed in regions other than a region in which the coil of the corresponding device is positioned.

Next, the control section 10 reports update requests of a management table to the priority determination task 130 on the basis of the results of the scan of Step S100 (Steps S105 to S130). The management table is information for managing the charging priority of each device, and for example, is stored in the RAM as information that has a data structure such as that shown in FIG. 2B. That is, in the management table, the coordinates at which a device is mounted on the mounting section 91b, a charging priority with respect to the device that corresponds to the corresponding coordinates, and a state of the corresponding device are stored in association with each other. "Charging", "Charging Scheduled" and "Detecting Motion" are included as states in the management table. "Charging" represents a state in which the fact that the device is capable of being charged has been confirmed by communication with the device using the device communication section 40, and electricity is being supplied by the electricity supply coil 20. "Charging Scheduled" represents a state in which the presence of a device on the mounting section 91b has been detected by the position detection coils 50, and the motion detection period has ended. "Detecting Motion" represents a state in which the presence has been detected by the position detection coils 50, and during motion detection. Display is performed in the UI control task 150, which will be described later, on the basis of the state column of the management table. Additionally, information that corresponds to devices for which charging has ended, and devices which it was not possible to charge, is deleted from the management table.

In Step S105, the control section 10 determines whether or not there are devices for which the state in the management table is "Charging Scheduled". In a case in which there are not any devices for which the state in the management table is "Charging Scheduled" (No in Step S105), the process migrates to Step S125. Next, the control section 10 determines whether or not devices for which the state in the management table is "Charging Scheduled" are still mounted (Step S110). More specifically, for example, the control section 10 determines whether or not there is a mounted device in a first range that is based on the coordinates of the corresponding device on the basis of the scan results of Step S100. In a case in which Yes is determined in Step S110, the control section 10 reports a coordinate update request of the corresponding device in the management table to the priority determination task 130 (Step S115). The reason for a coordinate update being required is so that the most recent coordinates are stored in the management table since it is possible that a charging scheduled device has moved slightly within the first range. Additionally, in a case in which the position has changed greatly beyond the first range, the control section 10 treats the situation as if removal of the device has occurred in the same manner as the subsequent Step S120 (as a result of this, a device for which the position thereof has changed greatly beyond the first range, is treated as a fresh device in Step S125 on the basis of the scan results of the next period of FIG. 3A).

In a case in which No is determined in Step S110, that is, in a case in which the device has already been removed from the first range that is based on the coordinates of the corresponding device on the basis of the scan results, the control section 10 reports a deletion request of the information related to the corresponding device in the management table to the priority determination task 130 (Step S120). Additionally, fine-tuning of the coordinates, removal determination, and the like, is performed for devices for which the state is "Charging" by the charging control task, which will be described later.

Next, the control section 10 determines whether or not there is a fresh device (Step S125), and ends the process that is shown in FIG. 3A in a case in which No is determined (the process from S100 is executed again in the next period). In a case in which Yes is determined in Step S125, a fresh device registration request with respect to the management table is reported to the priority determination task 130 (Step S130). More specifically, reporting to the priority determination task 130 is performed in a manner that registers in the management table with the priority of the corresponding device set to the lowest, the state thereof set to "Detecting Motion", and the coordinates thereof set to newly detected coordinates in the scan of Step S100. Further, the control section 10 activates the motion detection task 120 (Step S135), and temporarily suspends a self task (the device detection task 110) (Step S140). Additionally, in Step S135, the control section 10 reports (information that defines a position of) the motion detection region to the motion detection task 120. The motion detection region is a region that contains the coordinates at which the fresh device was detected, and is set as a region that is an area of an extent over which it is assumed that motion will be performed. Additionally, the area of the abovementioned first range is set to be smaller than an area of the motion detection region. In Step S140, if the device detection task 110 is temporarily suspended, the device detection task 110 is not executed during a period until the device detection task 110 is reactivated in the motion detection task 120, which will be described later.

Figure 3B:
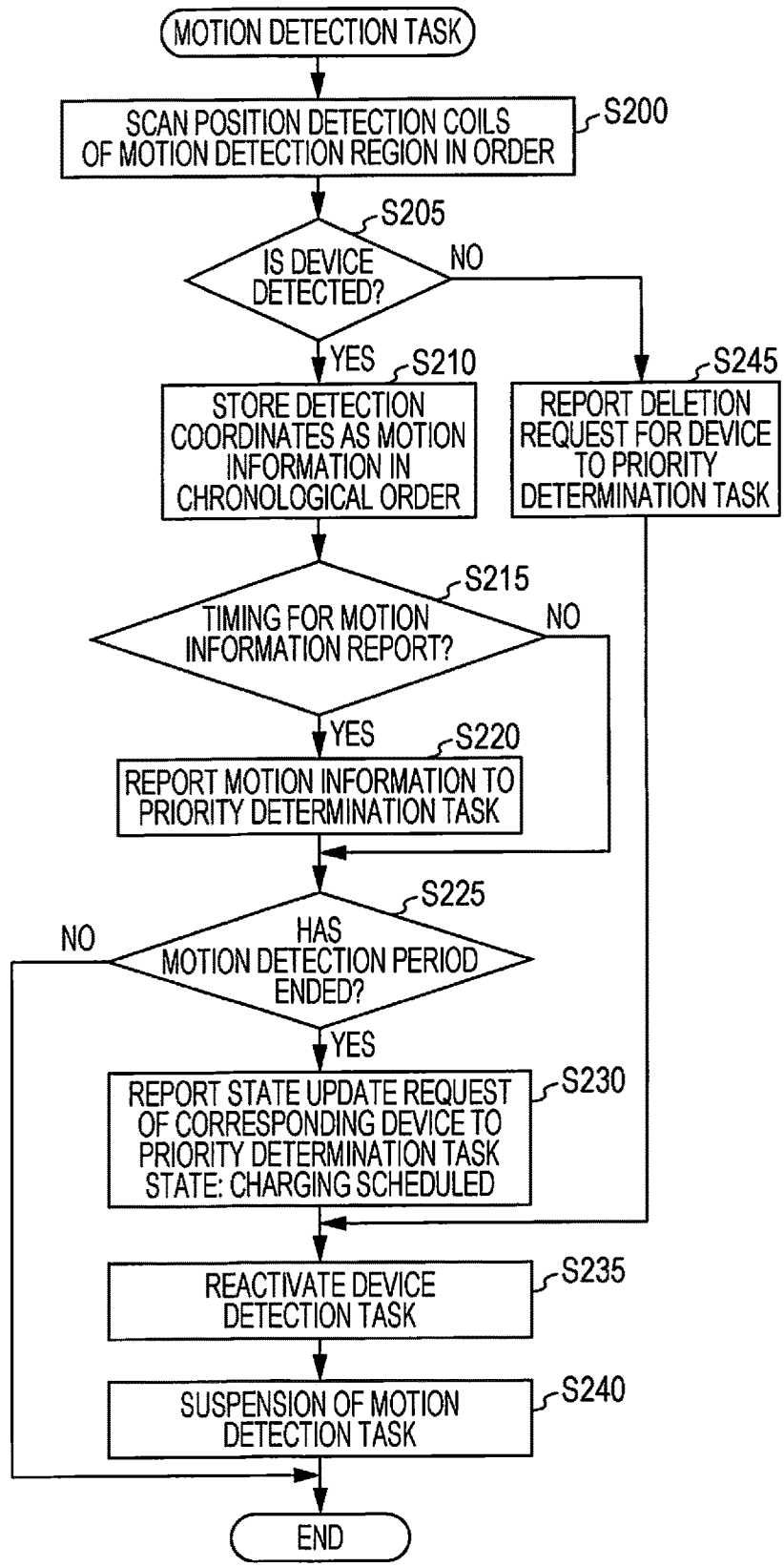
FIG. 3B is a flowchart of a motion detection task.

FIG. 3B is a flowchart that shows the process contents of the motion detection task 120. The processing that is shown in FIG. 3B is repeatedly executed for a predetermined period length in the motion detection period (for example, 5 seconds) immediately after fresh device detection. The corresponding period length is shorter than a period length (for example, 1 second) during which the device detection task 110 is repeatedly executed. That is, the motion detection task 120 is repeatedly executed at a frequency that is higher than that of the device detection task 110. Firstly, the control section 10 scans the position detection coils 50 that are included in the motion detection region, which was reported from the device detection task 110 (Step S135) in order (Step S200). More specifically, apart from a target scan region being different from the scan region in Step S100, the same process as that of Step S100 is performed. Next, the control section 10 determines whether or not a device was detected on the basis of the scan results (Step S205), and accumulates detection coordinates in the RAM as motion information in chronological order (Step S210) in a case in which Yes is determined in Step S205.

Next, the control section 10 determines whether or not it is the timing for a motion information report (Step S215), and reports motion information to the priority determination task 130 (Step S220) in a case in which Yes is determined in Step S215. In a case in which No is determined in Step S215, motion information is not reported. The timing for a motion information report is defined in order to partition motion in a temporal manner in the motion detection period. For example, in a case in which the length of the motion detection period is 5 seconds, the timing for a motion information report is, for example, provided every second from the initiation of the motion detection period. In a case in which the motion information that is reported at each timing for a motion information report in the priority determination task 130, which will be described later, is suitable, the priority of a device for which motion was performed is raised by one.

Next, the control section 10 determines whether or not the motion detection period has ended (Step S225), and ends the process that is shown in FIG. 3B in a case in which No is determined (the process from S200 is executed again in the next period). In a case in which Yes is determined in Step S225, a state update request of the corresponding device is reported to the priority determination task 130 (Step S230). More specifically, a requirement to update the state of the corresponding device to "Charge Scheduled" is reported.

Next, the control section 10 reactivates the device detection task 110 (Step S235), and suspends the motion detection task 120 (Step S240). If the device detection task 110 is reactivated, the process of FIG. 3A is repeatedly executed again for a predetermined period length, which is established in advance. If the motion detection task 120 is suspended, the motion detection task 120 is not executed during a period until the motion detection task 120 is subsequently activated in the device detection task 110 (Step S135) in a case in which a fresh device is mounted.

In a case in which No is determined in Step S205, it means that the device has been removed from the motion detection region during a motion detection period, and the control section 10 reports a deletion request of the information of the corresponding device from the management table to the priority determination task 130 (Step S245), and the process migrates to Step S235.

As a result of the motion detection task 120 being executed at a higher frequency than the device detection task 110, it is easier to precisely detect motion of a device. In addition, as a result of the device detection task 110 being executed at a lower frequency than the motion detection task 120, it is possible to reduce the power consumption in comparison with a configuration that always performs the same high-frequency detection as that of the motion detection period. In addition, as a result of a detection range of a device being set to be smaller in the motion detection task 120 than the device detection task 110, it is possible to reduce the power consumption in comparison with a configuration that performs position detection over a large range that includes areas other than the motion detection region in the motion detection period.

FIG. 4 is a flowchart that shows the process contents of the priority determination task 130. Firstly, the control section 10 determines whether or not there is a report from another task (Step S300), and ends the process that is shown in FIG. 4 in a case in which there is not a report (No in Step S300) (the process from Step S300 is executed again in the next period). More specifically, a report from another task includes a coordinate update request of a device (Step S115 in FIG. 3A), a deletion request of a device (Step S120), or a fresh device registration request (Step S130) from the device detection task 110, motion information (Step S220 in FIG. 3B), a state update request of a device (Step S230), or a deletion request of a device (Step S245) from the motion detection task 120, and a device deletion request (Steps S425 and S470 in FIG. 5), a state update request of a device (Step S445), or a coordinate update request of a device (Step S460) from the charging control task 140, which will be described later.

In a case in which it is determined that there is a report (Yes in Step S300), the control section 10 acquires the report (Step S305). Next, the control section 10 determines whether or not motion information is included in the acquired reports (Step S310), and in a case in which Yes is determined (Yes in Step S310), the control section 10 determines whether or not motion that a user performed with respect to a device is suitable (whether or not the motion is in accordance with a specific movement pattern) on the basis of the motion information (Step S315). In a case in which Yes is determined in Step S315, the control section 10 raises the priority of a device that corresponds to the motion information in the management table (Step S320). In a case in which the priority is already the highest, in the present embodiment, the priority is set to the lowest. In a case in which No is determined in Step S310, and a case in which No is determined in Step S315, the process migrates to Step S325. Next, the control section 10 updates the management table depending on other reports (Step S325), and reports a display update request on the basis of the management table after update to the UI control task 150 (Step S330).

More specifically, reports that can be included in the other reports in Step S325 are a coordinate update request of a device, a deletion request of a device, or a fresh device registration request from the device detection task 110, a state update request of a device, or a deletion request of a device from the motion detection task 120, and a device deletion request, a state update request of a device, or a coordinate update request of a device from the charging control task 140, which will be described later. In a case in which the reports acquired in Step S305 are only motion information from the motion detection task 120, the management table is not updated in Step S325.

Next, the control section 10 determines whether or not a target charging device has been switched, or whether or not the coordinates of the corresponding device have been fine-tuned (details will be described in the charging control task 140) on the basis of a report from the charging control task 140 (Step S335). In a case in which Yes is determined in Step S335, the control section 10 reports a charging request of a device with the highest priority in the management table to the charging control task 140 (Step S340), and ends the process that is shown in FIG. 4. Additionally, in a case in which No is determined in Step S335, the process that is shown in FIG. 4 is finished.

FIG. 5 is a flowchart that shows the process contents of the charging control task 140. Firstly, the control section 10 determines the presence or absence of a report of a charging request from the priority determination task 130 (Step S400). In a case in which Yes is determined in Step S400, the control section 10 acquires the corresponding report of a charging request (Step S405), and moves the electricity supply coil 20 to target coordinates (coordinates of a target charging device) using the driving section 30 on the basis of the report of the charging request (Step S410). In a case in which No is determined in Step S400, the process migrates to Step S415.

Next, the control section 10 determines whether or not charging control information has been received from a device (Step S415). Since it means that a device that is compatible with contactless charging is not present (either a device that is not compatible with contactless charging is mounted, or a device has been removed) in a case in which No is determined in Step S415, in a case of being in the middle of charging, the control section 10 suspends electricity supply to the electricity supply control section 21 (Step S420), and reports a deletion request of the corresponding device from the management table to the priority determination task 130 (Step S425). In a case in which Yes is determined in Step S415, the control section 10 determines whether or not an electricity supply suspension request is included in the received charging control information (Step S430). In a case in which No is determined in Step S430, the control section 10 determines whether or not charging efficiency has decreased on the basis of the charging control information, and the like (Step S435), and performs electricity supply to the electricity supply control section 21 (Step S440) in a case in which No is determined in Step S435. Additionally, in Step S440, electricity supply is initiated in a case in which electricity supply has not been initiated, and electricity supply is continued in a case of already being supplied. Next, the control section 10 reports a state update request for updating the state of the corresponding device in the management table to "Charging" to the priority determination task 130 (Step S445). In a case in which Yes is determined in Step S435, that is, in a case in which it is determined that the charging efficiency has decreased, the control section 10 performs fine-tuning of the coordinates of the electricity supply coil 20 (Steps S450 to S460). More specifically, the control section 10 suspends electricity supply to the electricity supply control section 21 (Step S450), performs a scan using the position detection coils 50 in the periphery of the current coordinates of the electricity supply coil 20 (Step S455), and reports a coordinate update request for updating the coordinates of the corresponding device in the management table to the coordinates of the device detected as a result of the scan, to the priority determination task 130 (Step S460). As a result of this, since a charging request is reported (FIG. 4, and Steps S335 to S340) from the priority determination task 130 which receives the report of the coordinate update request, it is possible to move the electricity supply coil 20 to the coordinates after fine-tuning in Step S410 of the next period of the process of FIG. 5.

In a case in which Yes is determined in Step S430, that is, in a case in which an electricity supply suspension request is received from a device, the control section 10 suspends electricity supply to the electricity supply control section 21 (Step S465), and reports a deletion request of the corresponding device from the management table to the priority determination task 130 (Step S470). Additionally, a case, in which the electricity supply suspension request is transmitted in a case in which charging has ended normally, and a case, in which the electricity supply suspension request is transmitted as a result of some sort of abnormality having arose on the side of the device, are assumed. Therefore, it may be suitable to discriminate between a circumstance in which charging has ended normally and a circumstance in which charging has ended abnormally, and advise a user. Therefore, in Step S470, a state update request for updating the state of the corresponding device in the management table to either "normal completion" or "abnormal completion" may be reported to the priority determination task. As a result of this, in the UI control task 150, which will be described later, it is possible to discriminate between these states and advise a user.

Figure 6:
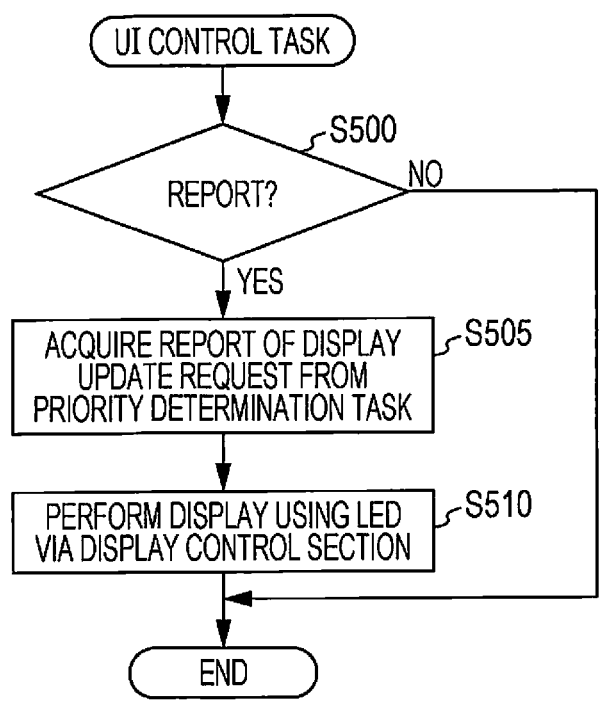
FIG. 6 is a flowchart of a UI control task.

FIG. 6 is a flowchart that shows the process contents of the UI control task 150. The control section 10 determines the presence or absence of a report of a display update request from the priority determination task 130 (S330 in FIG. 4, and Step S500). In a case in which there is a report, the control section 10 acquires the corresponding report (Step S505), and moves performs display using the LEDs 60 via the display control section 61 on the basis of the corresponding report (Step S510). More specifically, the control section 10 performs display that depends on the priority and the state of the corresponding device in a position that is based on the coordinates of the device in the management table, using the LEDs 60. To explain in further detail, in the present embodiment, the control section 10 shows the priority with the size of the diameter of a circle with the coordinates of a device set as the center thereof, and represents the state in the management table with lighting (flashing, being turned on, and the like) of the LEDs 60.

1-3. Priority Determination and Display

Figure 7A:
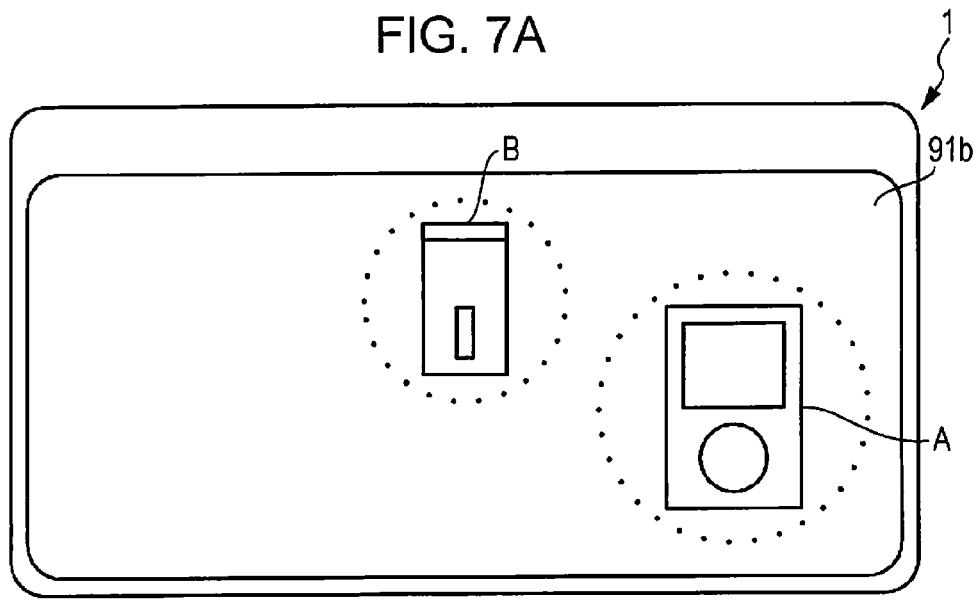
FIGS. 7A and 7B are schematic diagrams for describing the mounting of devices and display examples.

FIG. 7A shows a circumstance in which a device A and a device B are mounted on the mounting section 91b, and a circle is displayed by the LEDs 60 in a position at which each device is mounted. The diameter of the circle corresponds to charging priority, and the higher the charging priority is, the larger the diameter of the circle is displayed. Accordingly, in FIG. 7A, the charging priority of the device A is higher than that of the device B. In addition, a circle that corresponds to a device that is charging, and a circle that corresponds to a device that has a charging scheduled are displayed by changing the lighting state of the LEDs. For example, a circle that corresponds to a device that is charging is displayed with the LEDs flashing, and a circle that corresponds to a device that has a charging scheduled is displayed with the LEDs turned on. Additionally, a description will be continued for an example in which the circle that corresponds to the device A in FIG. 7A is displayed with the LEDs flashing, and the circle that corresponds to the device B in FIG. 7A is displayed with the LEDs turned on.

Figure 7B:
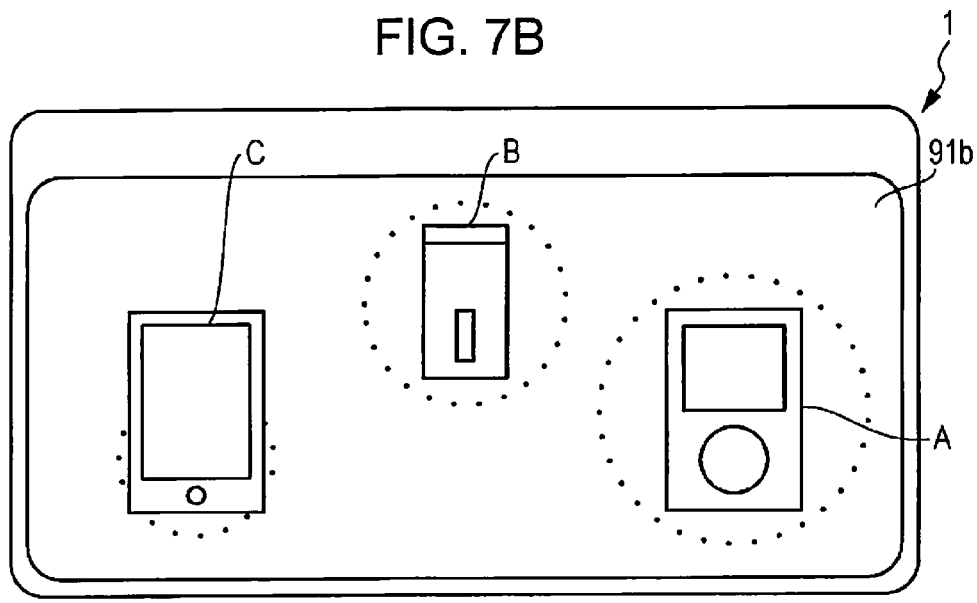

FIG. 7B is a view that shows a status in which a device C is newly mounted without motion in the state that is shown in FIG. 7A (that is, a state in which the device A is charging and the device B has a charging scheduled). In the abovementioned manner, in the charging apparatus 1, generally, devices mounted on the mounting section 91b earlier have a higher charging priority. Accordingly, since the charging priority of the device C, which was mounted most recently of the three devices, is set to be the lowest, the diameter of the circle that corresponds to the device C is the smallest. It is possible for a user to intuitively ascertain the charging priority as a result of the size of the circle.

Figure 8A:
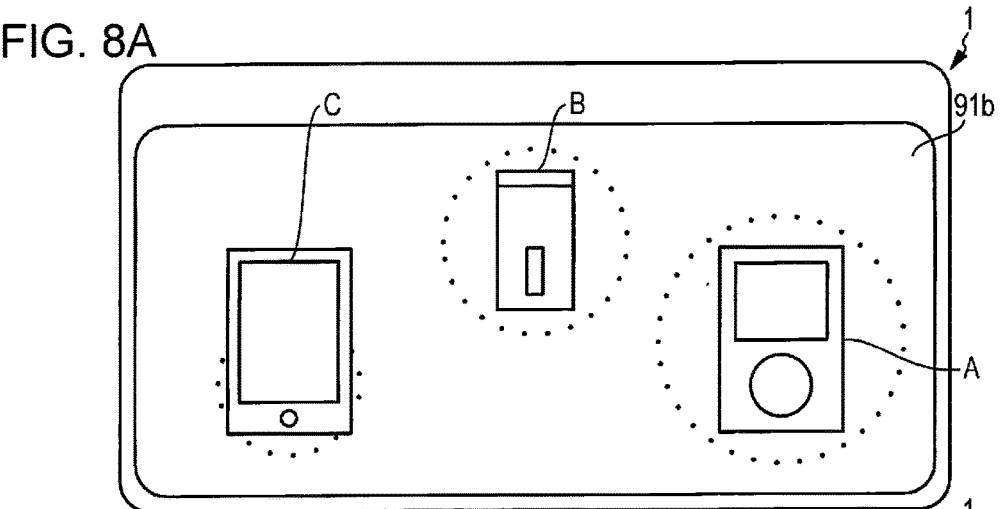
FIGS. 8A to 8C are schematic diagrams for describing a movement pattern of a device and display examples.
Figure 8B:
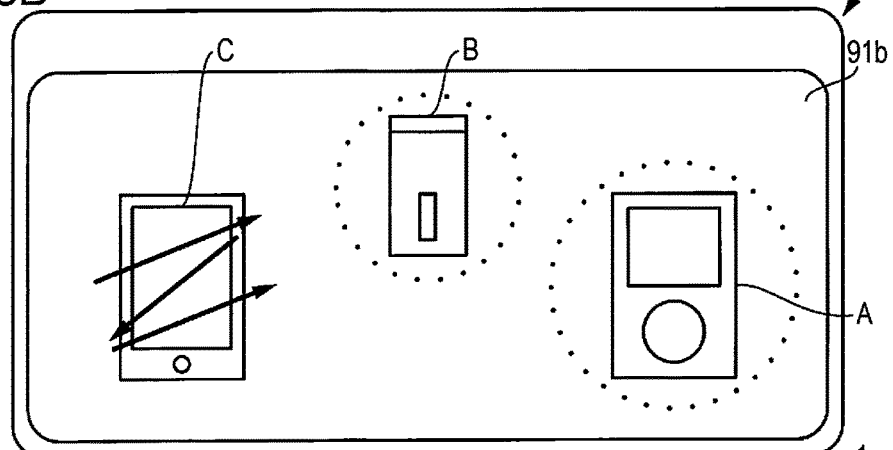
Figure 8C:
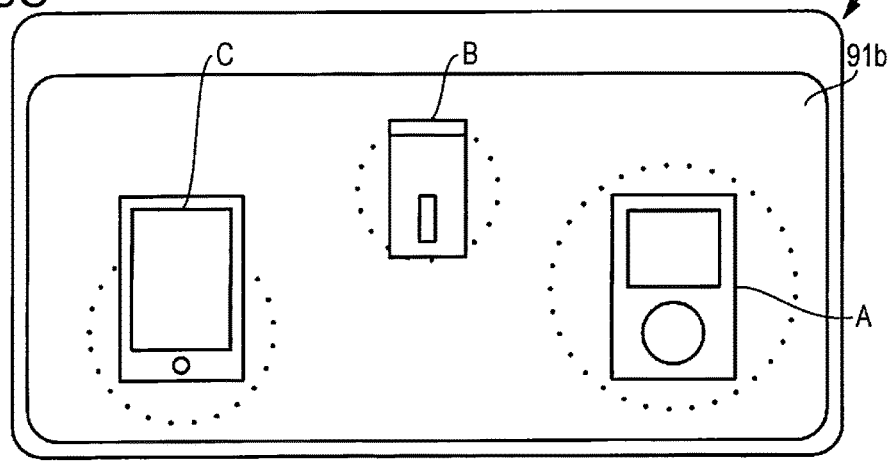

Next, a case of performing a motion in accordance with a specific movement pattern when mounting the device C will be described while referring to FIGS. 8A to 8C. FIG. 8A shows a circumstance immediately after a user has mounted the device C. The device A has the highest priority and is in a charging state, and the device B is in a charge scheduled state. In the same manner as FIG. 7B, the smallest circle is displayed corresponding to the device C in order to show that the priority thereof is lower than the other two devices immediately after the device C is mounted. The charging priority of the devices is A, B, C from highest to lowest. In a case in which a user moves the device C on the mounting section 91b with a motion that is shown by a specific movement pattern (for example, at least one back and forth motion such as that shown in FIG. 8B) in a period of 1 second immediately after the device C is mounted in a case in which the timing of a motion report is 1 second, for example, the control section 10 detects the motion, raises the priority of the device C by one, and sets the priority to second. As a result of this, the device B, the priority of which was second, is lowered to third priority. FIG. 8C shows display content after the priority is changed, that is, a circumstance in which a circle that corresponds to the device C is displayed larger than a circle that corresponds to the device B, and smaller than a circle that corresponds to the device A.

Additionally, in a case in which the device C is moved with at least one back and forth motion in a subsequent period of 1 second (in a period after 2 seconds have elapsed since the initiation of the motion detection period and before 3 seconds have elapsed) in a case in which the motion detection period is 5 seconds, for example, the control section 10 further raises the priority of the device C by one. As a result of this, the priority of the device A, the priority of which was highest and which was charging, is lowered by one, and electricity supply to the device A is temporarily ended. Further, electricity supply to the device C, the priority of which is now the highest, is initiated.

In the abovementioned manner, in the case of the present embodiment, a user can input an instruction that changes the charging priority to the charging apparatus 1 by moving a device on the mounting section 91b in accordance with a specific movement pattern. Additionally, since the configuration for inputting an instruction that changes the priority (the configuration that detects motion of a device) also functions as an existing configuration for detecting the position of a device on the mounting section 91b, a separate configuration for instruction input (for example, a touch panel or the like) is not necessary, and therefore, it is possible to contribute to a reduction in cost. Supposing that the charging apparatus 1 is provided with a touch panel for instruction input, the fact that it is necessary for a user to perform a priority setting by specifically operating the touch panel after mounting a device detracts from the ease of use of a contactless charging electronic apparatus that is capable of charging a device as a result of the device simply being placed on the charging apparatus 1. However, in the present embodiment, by moving a device on the mounting section 91b in accordance with a specific movement pattern, it is possible for a user to easily and conveniently designate the charging priority.

2. Second Embodiment

A charging apparatus 2 according to a second embodiment differs from the charging apparatus 1 of the first embodiment in that the charging apparatus 2 is capable of recognizing a different movement pattern in addition to the movement pattern for changing the charging priority, and when motion of a device, which is charging, with the corresponding different movement pattern is detected, it is possible to initiate data communication between the device, which is charging, and an external apparatus through the charging apparatus 2. In view of the similarity between the first and second embodiments, the parts of the second embodiment that are identical to the parts of the first embodiment and functionally identical (but not exactly identical) to the parts of the first embodiment will be given the same reference numerals as the parts of the first embodiment. As the external apparatus, a server, a PC or the like that is capable of communicating with the charging apparatus 2 via the communication I/F section 70 can be assumed. A device communication section 40 in the second embodiment receives charging control information in an interval between a predetermined period in the same manner as the first embodiment during a period in which the device is receiving power supply from the electricity supply coil 20. In the second embodiment, if it is detected that a device, which is charging, is moved with a movement pattern that is different to the movement pattern for changing the charging priority, data communication such as wireless data communication between the device and an external apparatus is performed in the interim between communication that receives the charging control information. In the second embodiment, the control section 10 and the communication I/F section 70 are further equivalent to the "processing section". For example, a synchronization process of data between a PC that is connected to the charging apparatus 2 and a device may be performed via the communication I/F section 70. More specifically, for example, it may be possible to synchronize (including both downloading and uploading) data of a predetermined application, which is installed on a device, with data of a PC version of the corresponding application, which is installed on the PC. Alternatively, it may be possible to back-up data that is stored on a recording medium of the device to a server that is connected via the communication I/F section 70.

Figure 9A:
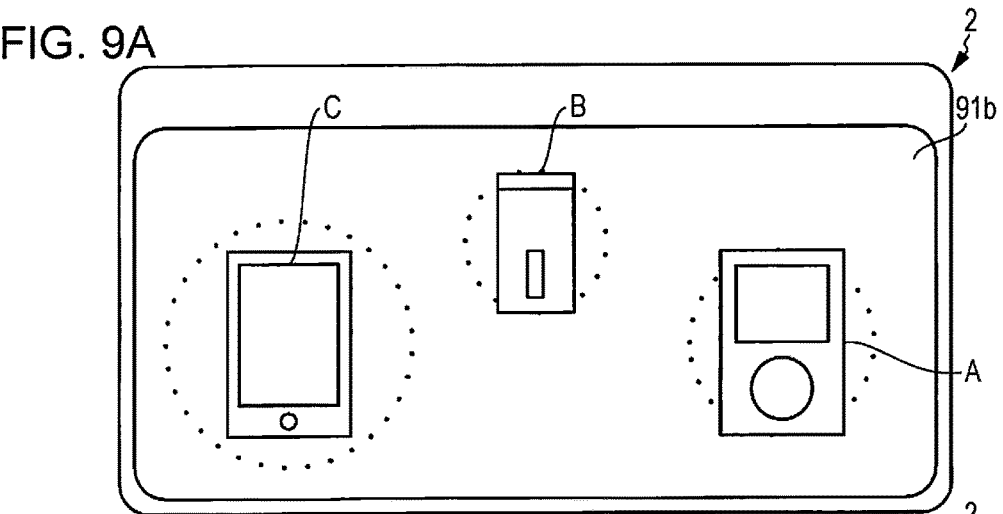
FIGS. 9A to 9C are schematic diagrams for describing a movement pattern of a device and display examples.
Figure 9B:
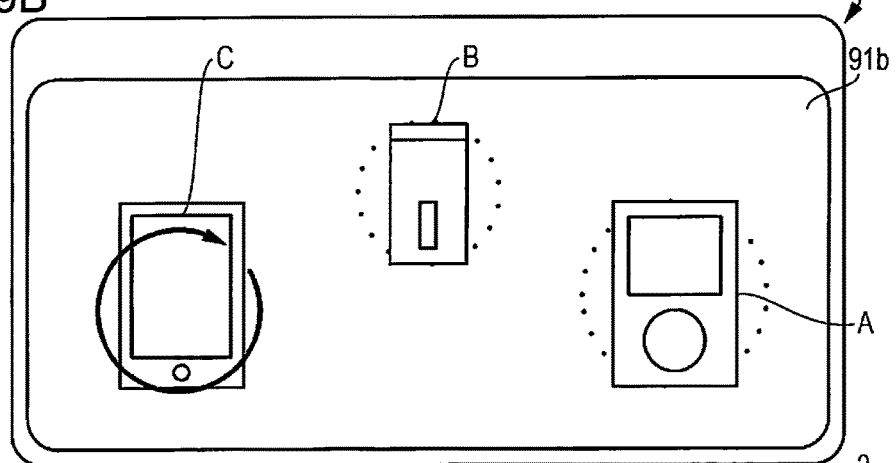
Figure 9C:
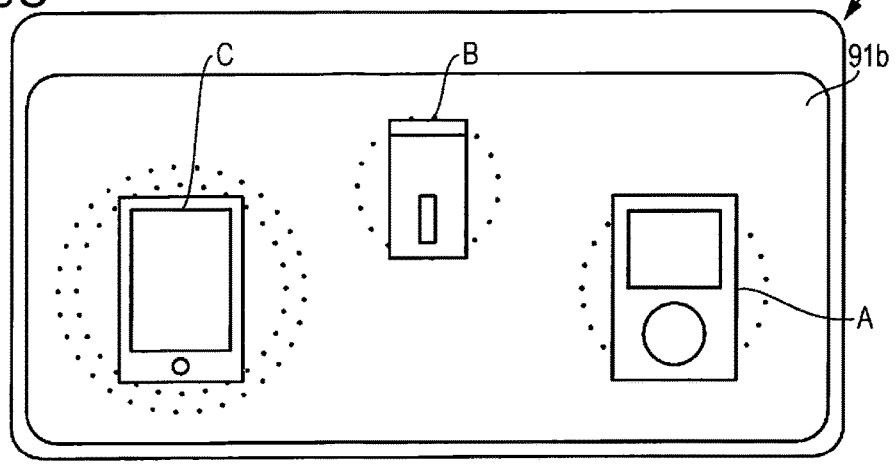

For example, rotation of a device in a state of being mounted on the mounting section 91b as shown in FIGS. 9A to 9C, or the like, may be used as a movement pattern that is different to the movement pattern for changing the charging priority. FIG. 9A shows a circumstance in which the priority of the device C is the highest, and the device C is charging. If the device C, which is charging, is rotated in the manner shown in FIG. 9B in the state that is shown in FIG. 9A, the control section 10 performs data communication for data synchronization of the device C with an external apparatus, or data back-up to an external apparatus. The charging apparatus 2 has a role of a data relay between an external apparatus and the device C. Additionally, an LED emission pattern may be set so as to discriminate between the display in a region in which a device, which is charging and is performing data communication and the display in a case of merely charging without performing data communication.

3. Other Embodiments

Additionally, the technical scope of the invention is not limited to the abovementioned embodiments, and naturally, various changes can be added within a range that does not depart from the scope of the invention. For example, in the abovementioned embodiments, a support substrate 33 that is capable of moving on a plane that is parallel to the xy plane, and a driving mechanism may be further provided separately from the support platform 33. Further, a second device communication section may be provided on the corresponding support substrate 33 separately from the device communication section 40, which is disposed on the support platform 33. In such a case, the control section 10 may determine the charging priority of a device that is moved with a first movement pattern, and initiate data communication with a device that is moved with a second movement pattern. That is, in a case of the present configuration, it is possible to initiate data communication with a device that is moved with the second movement pattern irrespective of the charging priority thereof.

In addition, in the abovementioned embodiments, a state of raising the charging priority depending on a specific movement pattern was illustrated by way of example, but a method for lowering the charging priority depending on a specific movement pattern is also possible. In addition, for example, a method that can both raise and lower the priority depending on two different kinds of movement pattern such as raising the priority if a device is rotated in a clockwise direction, and lowering the priority if a device is rotated in an anticlockwise direction, may also be used.

In addition, the priority of a data communication process between a device and an external apparatus may also be raised or lowered depending on specific movement patterns.

In addition, in the abovementioned examples, the priority is changed depending on a movement pattern of a device in the xy plane, but as long as it is possible to detect the movement of the device in the z direction which is orthogonal to the xy plane, the priority may be changed depending on a movement pattern of a device within an xyz space. Additionally, the movement patterns are not limited to those of the abovementioned embodiments. In addition, movement patterns for performing processes other than the abovementioned processes (changing the priorities of charging and data communication, and initiating data communication) may also be provided.

In addition, when the priority is changed, a configuration that includes a device, which is in the middle of a process (charging or communicating) in change targets may be used, and a configuration that does not include a device, which is in the middle of a process in change targets may be used. Not including a device, which is in the middle of a process in change targets means that the priority can change the order among devices that are scheduled, but cannot lower the order of a device, which is in the middle of a process, and suspend a process of a device, which is in the middle of a process.

In addition, in the abovementioned embodiments, a configuration in which the plurality of LEDs 60 are disposed on the substrate 93, and the mounting section 91b is capable of transmitting LED light was described, but the mounting section 91b itself may be configured by a liquid crystal panel. In addition, a figure such as a circle that is illustrated by way of example in the abovementioned embodiments, the indication of the priority and state of a device may be performed using characters. In addition, indication of this information may be performed using a difference in color or a flashing rate.

Additionally, a process for detecting a different fresh device may also be performed in a motion detection period after the detection of a fresh device. In addition, in the abovementioned embodiments, a scenario in which a device is moved in accordance with a specific movement pattern when the device is newly mounted was described, but naturally, it is also possible to change the priority in a case in which a device that is already mounted is moved with a specific movement pattern.

Additionally, in addition to an electromagnetic induction method, for example, an electrostatic capacitance technique or an optical technique (camera) may be adopted as a technique for detecting the position of a device.

In addition, the processing apparatus may be provided with other functions such as a printing function, a scanning function, or an imaging function. In this case, in place of or in addition to performing data communication between a device and an external apparatus, printing on the basis of data acquired from a device, the transmission of scanned data to the device, imaging on the basis of data acquired from the device or the like may be performed by performing data communication between a device and the processing apparatus.

According to an aspect of the embodiment, there is provided a processing apparatus including a detector that detects a position of a device, which is a target of a process, a control section that determines a priority of the device that is moved with a movement pattern according to the movement pattern of the device, and a processing section that performs the process on the device with the determined priority.

In this case, by moving a device in accordance with a specific movement pattern, it is possible for a user to designate priority compared to devices other than a moved device. As a result of this, it is possible for a user to reliably execute the process on a device with a priority according to their intentions.

Furthermore, in the processing apparatus, the process may be wireless power transfer.

In this case, it is possible for a user to easily designate the priority of a device, which is a charging target, when performing contactless charging of a plurality of devices.

Furthermore, in the processing apparatus, the process may be wireless data communication with the device.

In this case, it is possible for a user to easily designate the priority of a device, which is a communication target, when performing wireless data communication with a plurality of devices.

Furthermore, the processing apparatus may further include a platform that also functions as a display. In such a case, the detector may detect a position of the device on the platform, the processing section may perform the process on the device on the platform, and the control section may cause the display to display information, which shows the priority, in the vicinity of the device.

Since information, which shows the priority of a device that is mounted on the platform, is displayed in a region of the platform that is in the vicinity of the corresponding device, it is possible for a user to easily recognize the priority of the corresponding device.

Additionally, a device that is on the platform refers to a device that is in contact with a mounting surface of the platform, and is not limited a device being mounted on the platform in a vertical direction. For example, in a case of a configuration that causes adhesion between the platform and a device using a magnetic force, the device may be positioned in a direction that is orthogonal to a vertical direction with respect to the mounting surface of the platform.

Furthermore, in the processing apparatus, the control section may either raise or lower the priority of the device depending on the movement pattern of the device.

As a result of moving a device with a predetermined movement pattern, it is possible for a user to sequentially raise or sequentially lower the priority of the corresponding device among a plurality of devices.

Naturally, the processing apparatus may be capable of recognizing two different types of movement pattern, may be able to raise the priority of a device depending on the detection of movement with one movement pattern, and may be able to lower the priority of a device depending on the detection of movement with another movement pattern.

Furthermore, in the processing apparatus, the control section may determine the priority of power supply related to the device depending on a first movement pattern of the device, and may initiate data communication with the device depending on a second movement pattern of the device.

In this case, by moving a device with the first movement pattern, it is possible for a user to change the charging priority of the corresponding device, and by moving a device with the second movement pattern, which differs from the first movement pattern, it is possible to initiate data communication between the corresponding device and the processing apparatus. That is, if a user moves device with the second movement pattern, the processing apparatus can initiate data communication with the corresponding device immediately irrespective of the charging priority thereof.

Furthermore, in the processing apparatus, in a case in which a new device is detected, the detector may set a detection frequency of the position of the device to be higher than a case in which a new device is not detected, and may set a range of position detection at the corresponding detection frequency to be smaller than a case in which a new device is not detected, during a period following detection, which is established in advance.

In this case, by increasing the detection frequency in a predetermined period following the detection of a new device, which is established in advance, it is easier to precisely detect a movement pattern. In addition, as a result of the detection frequency of a case in which a new device is not detected being lower than that in the predetermined period following the detection of a new device, it is possible to reduce the power consumption in comparison with a configuration that always performs the same high-frequency detection as that following detection. In addition, by setting a detection range to be smaller than a case in which a new device is not detected during a period, which is the predetermined period (a period in which it is assumed that a device will move in a predetermined movement pattern) following the detection of a new device, in which high-frequency detection is performed, it is possible to reduce the power consumption in comparison with a configuration in which the same region as a case in which a new device is not detected, is set as the detection region.

Furthermore, in the processing apparatus, in a case in which a new device is detected, the detector may perform at least either one of setting a detection frequency of the position of the device to be higher than a case in which a new device is not detected, and setting a range of position detection of the device to be smaller than a case in which a new device is not detected, during a period following detection, which is established in advance.

Additionally, the functions of each section that are disclosed in the Claims may be realized by a hardware resource in which the functions are specified in the configuration thereof, a hardware resource in which the functions are specified by a program, or in a combination of both of the above. In addition, the functions of each section are not limited to components in which each function is realized by a physically and mutually independent hardware resource.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A processing apparatus comprising:
a detector configured to detect a position of a device which is a target of a process;
a control section configured to determine a priority of the device based on determining, using the position of the device, whether or not the device is moved according to a predetermined movement pattern; and
a processing section configured to perform the process on the device based on the priority of the device.

2. The processing apparatus according to claim 1, wherein the process is wireless power transfer.

3. The processing apparatus according to claim 1, wherein the process is wireless data communication with the device.

4. The processing apparatus according to claim 1, further comprising a housing on which the device is configured to be disposed, the housing being configured to function as a display, wherein
the detector is configured to detect the position of the device on the housing,
the processing section is configured to perform the process on the device on the housing, and
the control section is configured to cause the display to display information on the priority of the device in a vicinity of the device.

5. The processing apparatus according to claim 1, wherein the control section is configured to raise or lower the priority of the device depending on determining whether or not the device is moved according to the predetermined movement pattern.

6. The processing apparatus according to claim 1, wherein the control section is configured to determine the priority of the device to perform wireless power transfer relative to the device, depending on determining whether or not the device is moved according to a first predetermined movement pattern, and further initiate wireless data communication with the device depending on determining whether or not the device is moved according to a second movement pattern that is different from the first predetermined movement pattern.

7. The processing apparatus according to claim 1, wherein in response to detecting a new device, the detector is configured to set a detection frequency of a position of the new device to be higher than when the new device is not detected, and set a range of position detection of the new device to be detected at the detection frequency to be smaller than when the new device is not detected, during a predetermined period that follows the detecting of the new device and is established in advance.

8. The processing apparatus according to claim 4, wherein the control section is configured to raise or lower the priority of the device depending on determining whether or not the device is moved according to the predetermined movement pattern.

9. The processing apparatus according to claim 4, wherein the control section is configured to determine the priority of the device to perform wireless power transfer relative to the device, depending on determining whether or not the device is moved according to a first predetermined movement pattern, and further initiate wireless data communication with the device depending on determining whether or not the device is moved according to a second movement pattern that is different from the first predetermined movement pattern.

10. The processing apparatus according to claim 4, wherein
in response to detecting a new device, the detector is configured to set a detection frequency of a position of the new device to be higher than when the new device is not detected, and set a range of position detection of the new device to be detected at the detection frequency to be smaller than when the new device is not detected, during a predetermined period that follows the detecting of the new device and is established in advance.

11. The processing apparatus according to claim 6, wherein
in response to detecting a new device, the detector is configured to set a detection frequency of a position of the new device to be higher than when the new device is not detected, and set a range of position detection of the new device to be detected at the detection frequency to be smaller than when the new device is not detected, during a predetermined period that follows the detecting of the new device and is established in advance.

* * * * *